(12) United States Patent
Capdepuy et al.

(10) Patent No.: US 7,780,155 B2
(45) Date of Patent: Aug. 24, 2010

(54) METHOD AND DEVICE FOR FILTERING AND DAMPING VIBRATIONS

(75) Inventors: Marc Capdepuy, Seilh (FR); Philippe Verdun, Seilh (FR)

(73) Assignee: Artec Aerospace, Seilh (FR)

( * ) Notice: Subject to any disclaimer, the term of this patent is extended or adjusted under 35 U.S.C. 154(b) by 617 days.

(21) Appl. No.: 10/566,645

(22) PCT Filed: Mar. 31, 2004

(86) PCT No.: PCT/FR2004/000809
§ 371 (c)(1),
(2), (4) Date: Mar. 9, 2006

(87) PCT Pub. No.: WO2005/021995
PCT Pub. Date: Mar. 10, 2005

(65) Prior Publication Data
US 2007/0000722 A1   Jan. 4, 2007

(30) Foreign Application Priority Data
Aug. 1, 2003 (FR) ................................ 03 09571
Dec. 3, 2003 (FR) ................................ 03 14205

(51) Int. Cl.
*B60G 13/00* (2006.01)
(52) U.S. Cl. .................... 267/201; 267/145; 267/153
(58) Field of Classification Search ............ 267/201, 267/140, 153, 136, 142–145; 181/207, 208
See application file for complete search history.

(56) References Cited

U.S. PATENT DOCUMENTS

| | | | |
|---|---|---|---|
| 3,251,076 A | 5/1966 | Burke | |
| 4,822,011 A * | 4/1989 | Goldbach et al. | 267/201 |
| 6,068,081 A * | 5/2000 | Capdepuy et al. | 181/207 |
| 6,830,793 B2 * | 12/2004 | Hawkins et al. | 428/36.9 |
| 2002/0022525 A1 | 2/2002 | Hartel et al. | |

FOREIGN PATENT DOCUMENTS

| | | |
|---|---|---|
| FR | 950.411 | 9/1949 |
| FR | 2.194.897 | 3/1974 |
| FR | 2 739 213 A1 | 3/1997 |

* cited by examiner

*Primary Examiner*—Melanie Torres Williams
(74) *Attorney, Agent, or Firm*—Oliff & Berridge, PLC (57) ABSTRACT

The invention relates to a device to filter and damp the vibrations between a first element subjected to an incident vibratory wave and a second element radiating a filtered vibratory wave.

This device comprises an interface structure to transfer vibratory energy constituted by at least one elastic component and at least one dissipative component attached in parallel to the elastic component to ensure the filtration and damping of the incident vibratory wave, the dissipative component being constituted by two separate rigid frames ensuring, punctually or continuously, deflection functions, if required, by a lever arm effect, amplification of the vibratory energies generated by the elastic components towards a dissipative material positioned between them, the dissipative component providing damping for the elastic component.

19 Claims, 7 Drawing Sheets

METHOD AND DEVICE FOR FILTERING AND DAMPING VIBRATIONS

The technical sector of the present invention is that of the vibro-acoustic filtering and damping of vibrations of mechanical origin transmitted between two structures so as to mutually protect them from their vibratory environment.

Any element or structure included in a mechanical system incorporating a source of vibrations of mechanical origin receives vibratory and/or acoustic excitations from the source, modified or even amplified by the dynamic response of each of the structural elements constituting the system.

To ensure the system's mechanical strength, the structures or elements must be connected together by fastenings that provide sufficient static or dynamic rigidity.

To reduce the vibratory energy transmitted from one structure to another when these are mechanically connected, two known types of solution are used to date: filtering and damping.

The first solution consists in mechanically filtering the input excitations of the structure to be protected. The effectiveness of the filtering system is intrinsically linked to the resonant frequency of the system under load: the lower the cut-off frequency, the more effective the system. However, this flexibility caused by a lower cut-off frequency, leads to great motion space under load, incompatible with the immediate environment and causing the premature wear of the system.

For this, filtering may be obtained by integrating flexible elastic (leaf spring, metallic or composite spring) or hydraulic-elastic (fluid) or hyper-elastic (elastomer, silicon, specific alloy) systems to the interfaces of the structure to be protected.

Elastic suspension, despite its ensuring static and dynamic strength with potential vibratory and/or acoustic gains, has a very slightly damped specific resonance, injecting at this resonating frequency, redhibitory levels in the structure to be protected (low frequency displacements or accelerations with respect to resonant modes).

Patents FR-2 674 590 and JP-2 658 887 describe hydraulic suspensions constituted by chambers filled with a viscous fluid communicating by a narrow channel. When the suspension is stressed by a shock or by vibrations inducing relative displacements, the fluid will preferentially circulate towards one chamber or other depending on the direction of excitation, with a laminating function that will convert the vibratory energy into local heat. The incompressibility of the fluid improves suspension strength and its circulation provides damping for the stresses introduced. These suspensions are largely used in the car industry, in particular to uncouple the chassis from the running gear. However, they only function over a single degree of freedom and the viscosity of the fluid does not ensure the effectiveness of the behaviour over a wide frequency band. These suspension/damping systems are reserved for very low frequency filtering.

Hyper-elastic suspensions are constituted by thick blocks of elastomeric materials according to patents FR-2 704 612 or FR-2762564 for example. The flexibility of these suspensions is incompatible with the need for static and dynamic rigidity and thus implies the installation of limit stops. The behaviour of these systems, obligatorily tri-axial, is complex and even random, thereby limiting prediction of dimensioning. Moreover, their behaviour at high frequency deteriorates (structural stiffening) effect beyond the cut-off frequency) and their material architecture cannot cope with the levels injected (premature ageing) thereby imposing wide safety margins in their dimensioning.

To overcome these drawbacks, hyper-elastic suspension solutions are constituted by alternating superimposed layers of damping material and metal with or without limit stops. The leaf springs work by flexion (patent FR-2678221), by shearing (patent EP-0155209) or by buckling (patent FR-2672351) whilst ensuring a low cut-off frequency and mechanical strength. Given the architecture of the damping process (alternate layers of hyper-elastic and metallic materials), the damping performances are weak. Moreover, when the limit stop is stressed on the single degree of freedom, the stiffness increases suddenly and re-injects heavy vibratory levels into the structure.

Apart from filtering, to reduce the vibratory and acoustic annoyance radiated by a mechanical structure, multiple known solutions are based on the criteria of separating the resonant frequency of the structure from the excitation frequency by acting on the mass and stiffness parameters.

One solution consists in increasing the mass of the structure by covering the radiating surfaces with high density material (for example bituminous products). This solution is relatively effective on the high frequency band of the structure but deteriorates its performance at low frequency. Moreover, it causes a substantial increase in the volume and mass.

Another solution consists in increasing the stiffness of the structure so as to push the frequency of the resonant modes back beyond the excitation spectrum. This objective is difficult to fulfil since hyper-stiff structures are in all logic made heavier by the stiffening systems: the cost to performance ratio remains high. Moreover, resistance to wear is reduced because of the punctual concentrations of stresses with the appearance of new resonant modes at high frequencies. This solution does not solve the problem of resonance at high frequencies.

One type of solution introduces the notion of damping via prestressed viscoelastic materials. This solution enables structural vibrations which may form the origin of acoustic radiation to be dissipated, thanks to the radiating surface being covered with a sandwich of viscoelastic/metallic film material. This solution induces an increase in mass for limited damping performances.

Lastly, one solution, such as defined in an international document WO97/11451 filed by the applicant enables structural damping to be significantly improved over a wide frequency band. This technology, judiciously fastened in parallel to the radiating surface of a structure subjected to vibratory excitations, allows the vibratory waves to be diverted, amplified then converted from vibratory energy into another form of energy. The dissipation of energy thus generated in the structure by the parallel device, enables substantial damping to be provided over a great number of resonant modes with a limited impact on the mass and stiffness of the structure.

This state of the art thus enables on the one hand so-called "series" solutions that provide static and dynamic strength whilst enabling the filtering over a reduced low or high frequency band; and on the other, so-called "parallel" solutions ensuring a strong reduction in vibratory responses of the normal mode of the structures over a frequency.

Application WO-01/92754 describes a beam having a quite specific structure intended to be inserted between a vibrating structure and fixed structure. As presented, its conformation implies strong static and dynamic rigidity, incompatible with low frequency filtering and damping.

Thus, there are no "series" technology solutions enabling all the functionalities mentioned above to be combined, that is to say strong damping and functioning over a wide frequency band.

The aim of the present invention is to supply such a system.

The invention thus aims to enable filtering with strong damping of the amplifications at resonant frequencies between two structures.

The invention thus relates to a process to damp and filter the amplitude of mechanically-originated vibrations of a structure to be uncoupled, wherein the incident vibratory wave is filtered associated with damping, by providing absorption of the filtered vibratory wave transmitted over the frequencies and the mechanical load amplitude applied.

Advantageously, the process associates a series suspension in the form of a suspension assembly mounted in series between two elements of the structure with a damping device mounted in parallel to the suspension.

Advantageously, the damping device is of the parallel type and has an internal geometry able to provide a deflection, and if required also an amplification and location of the vibrations to ensure damping of the filtered vibratory wave, and the series suspension at the same time has a sufficiently rigid static support function, and dynamic filtering functions with variable characteristics depending on the level of the load to be applied to the structure.

The invention also relates to a device to filter and damp the vibrations between a first element subjected to an incident vibratory wave and a second element radiating a filtered vibratory wave, wherein it comprises an interface structure to transfer vibratory energy constituted by at least one elastic component and at least one dissipative component attached in parallel to the elastic component to ensure the filtration and damping of the incident vibratory wave, a frequency and the mechanical load amplitude applied.

Advantageously, the interface structure comprises a plurality of elastic components positioned in series between the two elements, and a plurality of dissipative components each attached in parallel to each elastic component.

Advantageously again, the dissipative component is constituted by two separate rigid frames ensuring, punctually or continuously, deflection functions, if required, by a lever arm effect, amplification of the vibratory energies generated by the elastic components towards a dissipative material positioned between them, this dissipative component providing damping for the elastic component.

According to one embodiment, the dissipative component has a linear profile and is constituted by an assembly of rigid aligned frames, attached by their bases to the elastic components and independent of one another such that their relative movements, corresponding to an amplification by lever arm effect of the vibratory response of the elastic component, are transmitted by their ends to a dissipative material onto which a continuous or discontinuous stress plate is mounted to transfer the vibratory energy to the frame assembly.

According to another embodiment, the dissipative component is rotational and constituted by an assembly of rigid frames, spaced cyclically or not around a central part, attached rigidly or not at one end to the elastic component on the one hand and free at the other end so that the relative movements of these frames are transmitted to the dissipative materials, and attached on the other hand to a continuous or discontinuous stressed plate able, through the dissipative materials, to ensure the retention of the frame assembly.

According to yet another embodiment, the elastic component comprises an assembly of two rotational sub-assemblies having a continuous or discontinuous evolutive profile of the elastic leaf spring type, at least one of whose ends has an evolutive contact surface, the assembly being completed by a zone in which the dissipative materials are inserted.

Advantageously, the elastic leaf springs have potentially non-linear stiffness conferred by their evolutive geometric profile to ensure a gradual contact of the leaf spring with the matching profile of the other leaf spring, to provide the evolution of the filtering frequency and a controlled relative motion space of the leaves according to the dynamic load applied.

According to yet another embodiment, the interface structure is rotational or not and is composed of an elastic leaf spring rigidly connected to the element and an elastic leaf spring rigidly connected to the element, the springs being connected together at their free ends and wound around a ring, elastic or not, using layers of dissipative materials, and coming into direct contact according to the dynamic load applied to ensure the non-linear filtering and damping function.

Advantageously, the elastic leaf springs have potentially non-linear stiffness thanks to their evolutive geometric profile and by the gradual contact between the leaf springs whose profiles reciprocally match their respective admissible maximal deformation, to provide, depending on the dynamic load applied, the evolution of the frequency and a controlled or even limited relative motion space of the elements.

Advantageously again, the dissipative material converts the vibratory energy into another form of energy, for example heat energy by friction between materials or with viscoelastic materials, electrical energy with piezoelectric materials, magnetic energy with magnetostrictive materials, or any other form of energy.

Advantageously again, the elastic component has at least two dimensions and may be formed by assemblies of beams, plane plates or more complex shapes and in that its elastic properties stem from elastic materials, metallic or not, homogeneous or not, isotropic or anisotropic.

One result of the present invention lies in the fact that the method for filtering and damping the amplitude of vibration phenomena of mechanical origin, transmitted to and/or radiated by structures towards an element or towards another part of a structure is notable in that it associates support, filtering and damping functions, a frequency and mechanical load amplitude applied.

Another result of the present invention lies in the fact that the method for filtering and damping the amplitude of vibration phenomena of mechanical origin, transmitted to and/or radiated by structures towards an element or towards another part of a structure is notable in that it performs a so-called "series" function by its association with a so-called "parallel" process, functioning over a frequency. In improving it, this association extends its field of application.

Another result of the invention lies in the control of the non-linearity introduced in the series structure and is notable in that it enables the control of the admissible motion space, this according to the load to be applied to this structure.

Another result of the invention lies in a process to build a so-called series suspension for any object or structure, based on the internal multiplicity of the devices and notable in that this process allows the suspension to be used along one or several degrees of freedom.

Another result of the invention lies in the association of a so-called series suspension for an object introducing non-linearities with the so-called parallel process notable in that it enables the performances of both devices, strong damping, strong excitation load) in a small volume at a reduced mass.

Another result of the invention lies in the filtering by an elastic suspension placed in series between the structures to be insulated whose potentially non-linear flexibility enables the filtering function to be maximised beyond its own resonant frequency.

Yet another result of the invention lies in the fact that the elastic suspension enables the static retention of the load and the amplitudes of precise and limited dynamic movements over a frequency and excitation loads.

Yet another result of the invention lies in the fact that the elastic series suspension ensures a deflection of the direction of the incident vibratory wave towards a damping device positioned in parallel to this suspension.

Yet another result of the invention lies in the capacity of the damping device to provide structural damping in the elastic suspension and, because of this, damp its vibratory response.

Advantageously, the association of two structures with a damping device enables the vibratory energies associated with the incident wave to be converted into another form of locally dissipated energy. The damping properties of the overall device thus produced are thus those of the associated damping device. Upon this basis, the applicant has carried out research in the aim of improving its previously developed parallel damping devices which already provide strong damping of the vibratory response of the resonant and deformation modes of the elastic suspension in order to develop its performances within the scope of an association with a series device, thus enlarging the device's field of application.

The introduction of non-linearities and their control enables the elastic series suspension to limit the motion space of the suspended element in the case of strong excitation load and this without re-injecting either disturbances or shocks into the element.

The association of non-linearities with known parallel damping devices is notable in that it improves the exploitation of its damping properties, namely for strong excitation loads.

The association of a non-linear series suspension with known parallel damping devices is notable in that it enables suspension to be obtained that has good damping performances (strong damping, strong excitation load) in a restricted volume at a reduced weight.

The internal multiplicity of the damping devices and the non-linearities is notable in that it confers the good performance already mentioned to the suspension and this along one or several degrees of freedom.

The internal geometry of the series suspension made with the mechanical elements is notable in that the static positioning it ensures does not evolve over time as is the case for known series suspensions composed of elastomer.

Other characteristics, particulars and results of the invention will become more apparent from the additional description following, given by way of illustration, with reference to the appended drawings, in which:

FIG. 9 is a section AA of FIG. 8, FIGS. 10 and 11 show another embodiment of the device according to the invention.

To better illustrate the method and device according to the invention, the application of a wave will be considered that is of mechanical origin, vibratory, micro-vibratory or nano-vibratory in input by its incident surface and a vibratory, potentially sound, wave in output by its radiating surface.

According to the dynamic behaviour of a material positioned between an incident and radiating surface the wave transmitted will be more or less damped. Thus, when the material has a "neutral" behaviour with respect to the excitation field, the incident wave is fully transmitted to the radiating surface. Inversely, the flexibility of the material may generate an increase in the radiating wave (over-voltage to system resonance) before filtering becomes effective.

The invention aims at filtering the incident wave and damping the vibratory wave generated by the radiating surface of a material constituting an element subjected to vibrations of mechanical origin at the incident surface. This material is composed of an association of elastic and dissipative structures defining an interface structure to transfer vibratory energy.

A material with dissipative structure, is defined as a material whose particles generate loads which are not proportional to the relative displacements imposed on them and which do not give back all the deformation energy transmitted.

According to the invention, the dissipative material can convert vibratory energy into heat energy thanks to its viscoelastic properties by friction between two structures or by any other mode.

According to the invention, the dissipative material can convert vibratory energy into electric energy thanks to its piezoelectric or magnetostrictive properties.

Figure 1:
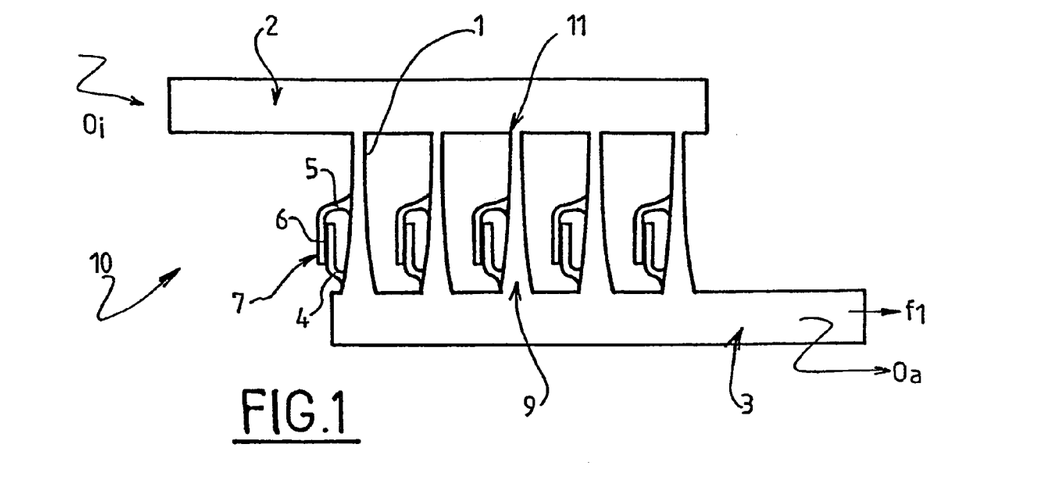
FIGS. 1 and 2 show a first embodiment of a material according to the invention in configurations of vibratory wave levels transmitted.
Figure 2:
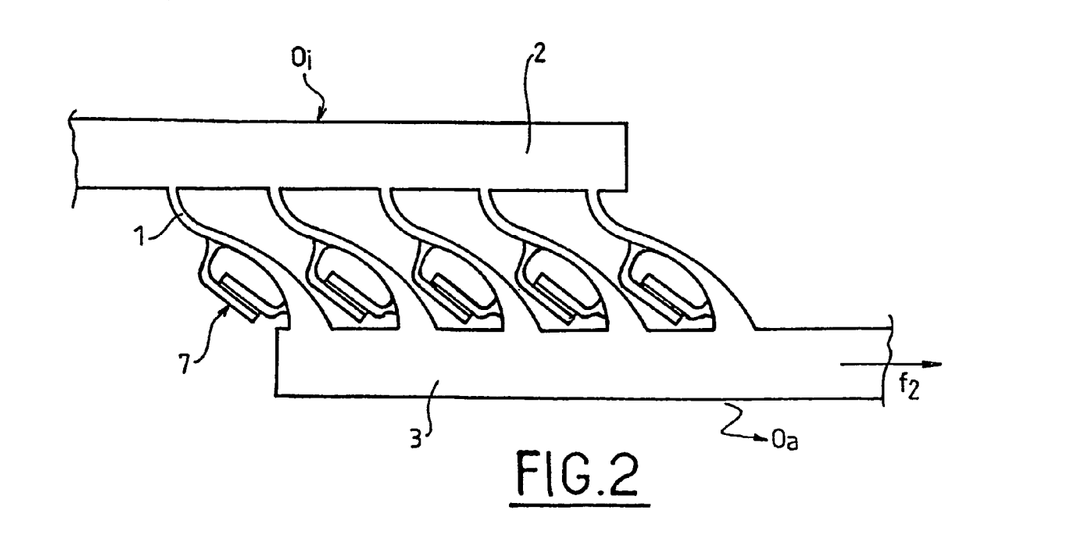

FIGS. 1 and 2 show an assembly composed of a combination by juxtaposition or superimposition or transversal or longitudinal nesting of pluridimensional geometric motifs making up a dissymmetrical anisotropic structure, which is to say having along any of its axes solid motifs, dissymmetrical or not, and dissymmetrical cavities or non dissymmetrical cavities, which act to disturb wave transmission whatever its original direction. The structure according to the present description is a geometrical body entering into the composition of the structure of the device and in the implementation of the process. This structure has at least two dimensions and may be formed by assemblies of beams, straight or curved bars, solid volumes, plane plates, or more complex shapes, as will be described hereafter.

FIG. 1 schematises the principle retained to amplify the deformations which is based on the use of a strongly anisotropic material or structure 10. The interface structure 10 is interposed between a first element 2 rigidly attached to a support (not shown) and a second element 3 subjected to vibrations. This structure 10 is constituted by an assembly of elastic leaf springs 1 and dissipative components 7. These leaf springs 7 are given a geometry and orientation which pilots the evolution of stiffness non-linearity according to their elongation, and these leaf springs 1 can be observed to have a part 9 attached to element 3 and another part 11 attached to element 2. A damping device 7 is installed on each spring constituted by two frames 4 and 5 whose free ends are joined with a dissipative structure 6.

Even though the system is fully bijective, for the purposes of simplification and for the remaining embodiments described hereafter, element 2 is designated as the element via which the incident vibratory wave is transmitted, and element 3 as the element transmitting the radiating vibratory wave.

When the load f1 transmitted by the wave Oi of vibratory origin is applied, the springs deform deflecting the direction of the incident vibratory direction by deforming according to a mechanism previously established on their own modal behaviour as shown by way of illustration in FIG. 2. In parallel to each leaf spring, the damping device 7, thanks to the frames 4 and 5 judiciously positioned on each spring, enables these energies to be deflected and, if required, amplified. These are finally transmitted in a privileged direction or directions through the dissipative structure 6 with the frames 4 and 5.

Under the action of the dynamic load and thanks to the potential deformation types of the leaf spring 1, function of their evolutive profile, the distribution of the vibratory energies and the level of internal constraints in the springs 1 and consequently their stiffness are modified. Since this mechanism is established in advance, the damping device 7, effective over a frequency applied, is thus always able to dissipate these energies. In FIG. 1, where the deformation rate of the springs 1 is considered to be weak, the structure 10 is sufficiently flexible to statically support element 3, limits its motion space and filters the majority of the loads F1 at low or high frequency. In this case, the low or high frequency damping properties are used with slight deformation of the dissipative structure. In FIG. 2, under a strong dynamic load F2, the stiffness of the springs 1 is strongly increased with their deformation rate. The structure 10 is thus stiffened thereby limiting the motion space to the required level. But under the combined action of the dynamic mass of element 3, this structure remains flexible enough to filter low frequencies. In this case, the damping properties are used with slight deformation of the dissipative structure.

The stiffness properties, by extension of the strength and damping of the assembly thus remain respectively piloted and this whatever the level or frequency of the dynamic excitation, by those of the suspension and dissipative structure.

With the anisotropic conformation presented above, it is thus possible to create suspension whose stiffness is low at low frequency and with a low level of stressing and much greater when the loads applied are greater. This strong non-linear geometry allows flexible suspensions to be produced which are damped whilst integrating rigidity at a high level of deformation. Limit stops for damping mounts are no longer required. Moreover, the abrupt variations in stiffness linked to mechanical limit stops (fixed stop) no longer exist. The shock phenomena limiting equipment service life are thus eliminated.

Figure 3A:
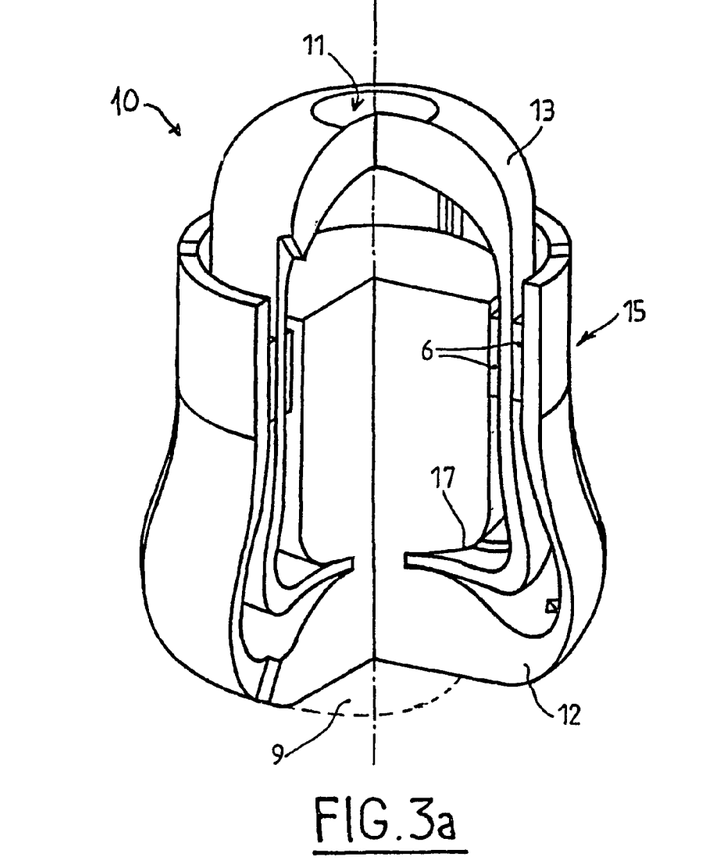
FIGS. 3a and 3b show another embodiment of the device according to the invention.
Figure 3B:
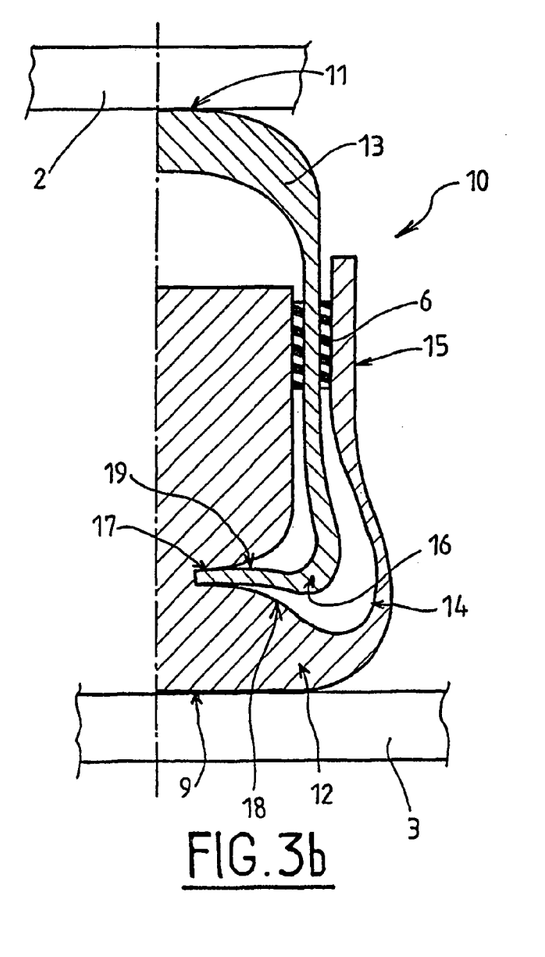

FIGS. 3a and 3b show sections of another embodiment of the invention in the form of a structure 10 placed between the incident surface 11 of element 2 and a radiating surface 9 of element 3. The structure 10 is constituted of two sub-assemblies 12 and 13 nested into one another at one of ends 17. At another end 15, sub-assembly 13 is partially caught between the frames of sub-assembly 12 thanks to the dissipative component 6. Between ends 15 and 17, elements 14 and 16 constitute elastic leaf springs of the interface structure. These springs 14 and 16 respectively represent the central parts of sub-assemblies 12 and 13 and have an evolutive profile section whose base is firmly attached respectively to the incident 11 and radiating 9 surfaces. This profile may be continuous or discontinuous, axisymmetrical or dissymmetrical.

The adoption of an elastic leaf spring 14 or 16, for example made of a composite material, such as glass or carbon fibres embedded in a polymerised synthetic matrix, enables mechanical properties to be obtained that are strongly anisotropic and resistant under heavy loads.

Links 15 and 17 between the sub-assemblies 12 and 13 enables the leaf springs to be prestressed in flexion, traction or torsion, such that under the effect of the weight of element 3, the system is in its resting position in a functioning zone of average stiffness.

As a whole the dimensional characteristics and the materials constituting the springs 14 and 16 combine to intensify the non-linearity of their behaviour according to the dynamic load applied.

When a dynamic load is transmitted between the incident 11 and radiating 9 surfaces, the springs 14 and 16 deform according to different pre-established mechanisms (flexion, buckling, torsion, traction, . . . ) according to the excitation level and frequency. These different deformation modes induce a modification of the stiffness of the elastic material. The natural frequency of springs 14 and 16 is thus modified, thereby enabling the filtering frequencies of the process to be controlled and extended.

So as to improve the non-linear dynamic behaviour of the filtering element, the base of sub-assembly 12 has a profile 18 at its end 17 which has a potential contact surface with profile 19 of spring 16, by moulding to the shape of the maximal deformation of the spring 16. Contact is not established when the deformation rate of the spring 16 is weak. Over a certain threshold, contact is initiated over a small portion of the spring 16. The behaviour of the spring is thus slightly modified. If the dynamic load increases, the contact surface gradually increases and the dynamic behaviour of the spring 16 is strongly disturbed leading to a significant impact on the increase in stiffness.

The impact of such an input of non-linearity of the contact type enables high levels of dynamic load to be reached, be it at low or high frequency, without any danger of damaging the device. The fact the profile 18 of sub-assembly 12 matches the deformed state of the spring 16 avoids any abrupt contact being made, contrary to known limit stops.

The disturbance of the wave transmission between the incident 11 and radiating 9 surfaces is deflected towards the damping device 15 in a zone ensuring maximum relative rotations or displacements of the springs according to their deformation. The damping devices 15 caught between a rigid part of sub-assembly 12 and the elastic spring 14 and 16 enable the relative energies to be absorbed through a suitable link whether rigid, rotoid, spherical or flexible along privileged directions.

As a whole the device assembly described fulfils the damping function enabling functionalities of deflection, amplification and conversion of energy of vibratory and/or acoustic energies to be ensured.

Thus, in the application which has just been described, the damping device 15 dissipates the energy of vibrations from the springs 14 and 16 thanks to the addition of a viscoelastic material 6 in zones 15 where the energy of the vibratory wave is concentrated by the geometry of this material. The structure of the material enables one or several degrees of freedom of the material to be deflected and privileged for which viscoelastic damping is the most effective. The application of the invention thus enables the energy of the incident vibratory wave to be deflected in zones 15 of springs 14 and 16, and then dissipated in another form in well defined zones 15 and in directions which imply certain vibration modes of mechanical origin of the radiating wall.

The internal properties of the composite material constituting the zone 15 influence the vibratory response of springs 14 and 16 by damping its vibrations. From that point, the process and device according to the invention have sufficient functionalities to satisfy the needs for filtering and damping required by the user.

According to the invention, the parallel damping device, used in the series suspension or with any other structure may have different profiles or geometries, so long as the damping process and device according to the invention are respected.

Figure 4:
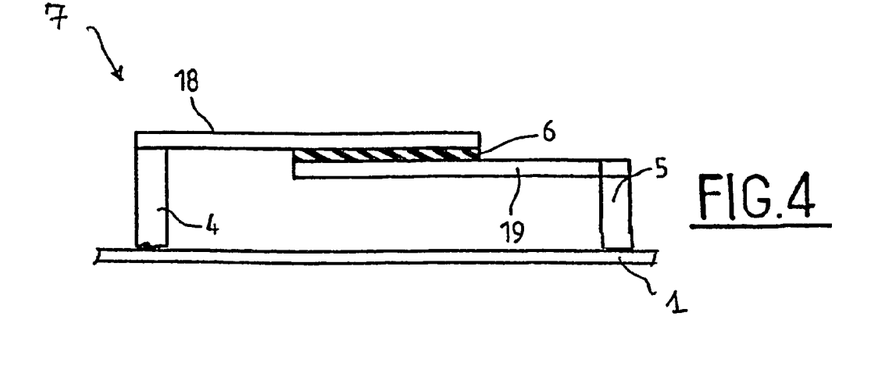
FIG. 4 illustrates the unidirectional damping principle according to the invention.

The simplest form is shown in FIG. 4, where the energy-converting material 6 may be arranged between the two rigid plates 18 and 19 of the structure 7, itself linked to the spring 1 of any other vibrating element using the rigid plates 4 and 5, reference being made to the embodiment shown in FIG. 1. The privileged conversion functioning mode corresponds to a deflection of the vibratory energies from the spring 1, amplified by elements 4 and 5, towards plates 18 and 19, which transfer these energies to the dissipative material. In the case presented, dissipation is generated by a dynamic shearing of the material 6.

As soon as the vibratory energies require it, the process may integrate an amplification functionality for the vibrations before they are transmitted to plates 18 and 19 by facilitating the lever arm effect of plates 4 and 5. This amplification may also be performed either by the internal geometry of the series suspension itself or the structure on which the device is mounted in parallel, either by attaching it between two non-contiguous points, providing sufficient differential for displacements or deformations.

Figure 5:
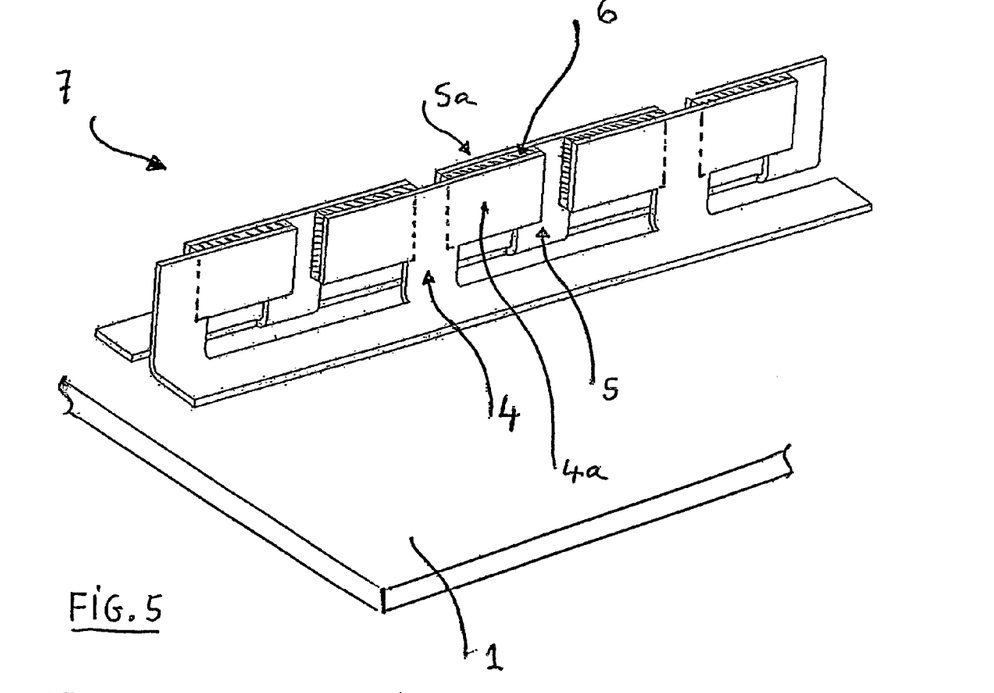
FIGS. 5 to 7 show variants of the principle enabling bidirectional damping and dissipation.
Figure 6:
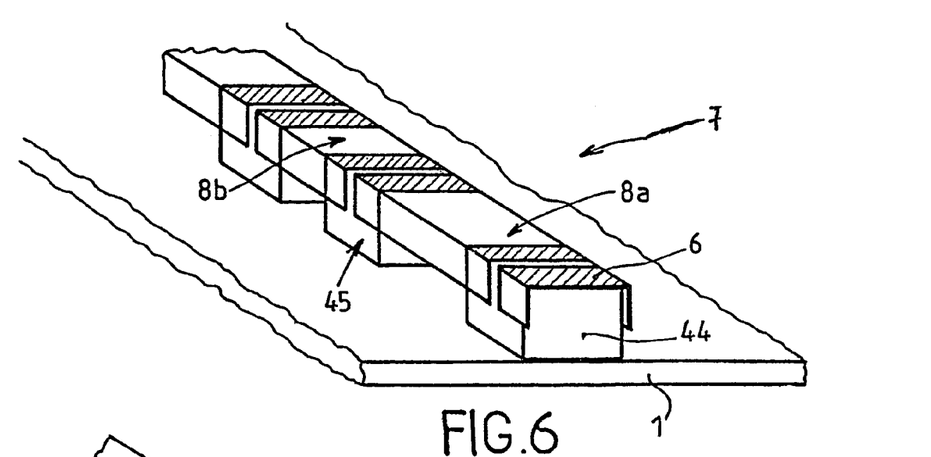
Figure 7:
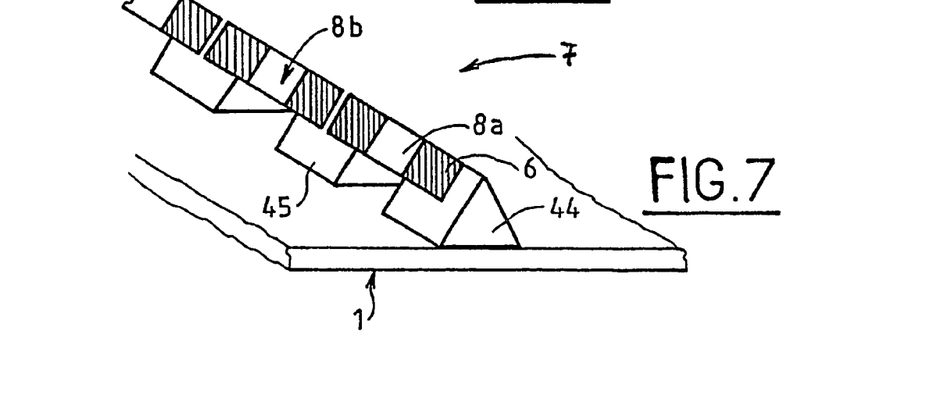

By way of example, FIGS. 5, 6 and 7 show, non exhaustively, different forms which the improved parallel damping device may be given to be used in the series suspension or in any other structure.

FIG. 5 shows an embodiment 7 in which the frames 4 and 5 have a T-shaped profile, connected at their base to springs 1 and between which at their respective ends the dissipative material 6 has been integrated.

FIGS. 6 and 7 show, non exhaustively, specific forms which can be given to the parallel damping device 7. The embodiments are obtained using an assembly of aligned rigid frames 44 and 45, attached at their base to spring 1 or to any other elastic structure having unjoined upper ends. At these ends, their relative movement corresponds to an amplification by lever arm effect of the vibratory response from the elastic component 1 and is transmitted to the lower surface of the dissipative material 6. The upper face of this dissipative material 6 is held in place by a continuous or discontinuous rigid stress plate 8a and 8b. The relative deformations to which the dissipative material is subjected, maximal on one side and nil on the other, enable a high level of vibratory energy to be efficiently converted.

In the embodiments shown in FIGS. 4, 5, 6 and 7, the deflection, amplification and conversion are performed by a so-called lineic implementation of the devices in that they facilitate bidirectional treatment. Other forms of surface conditions are identified so long as they enable multidirectional treatment.

Figure 12:
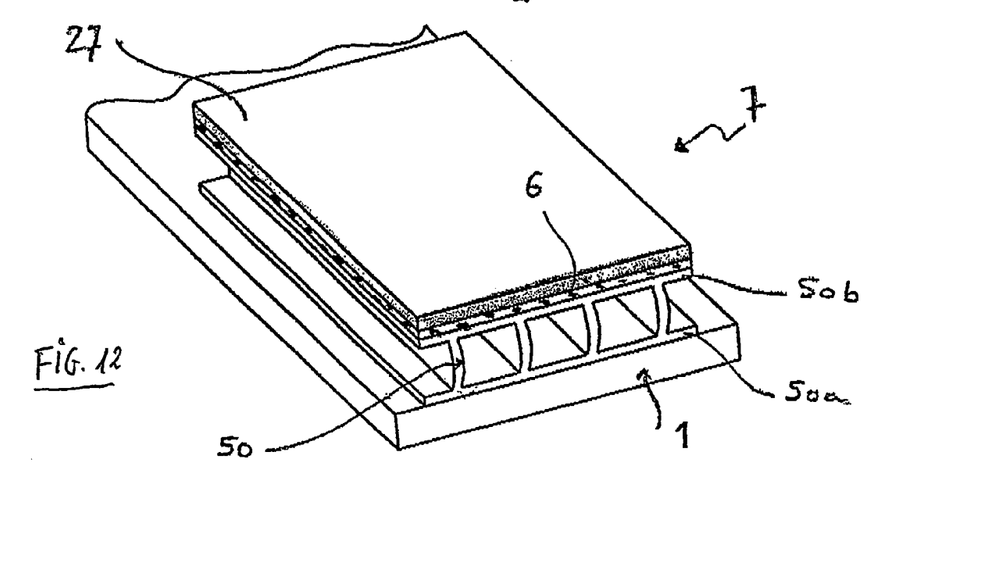
FIGS. 12 and 13 illustrate an extension of the concept enabling multidirectional damping and dissipation.

Thus, a first surface form of the damping device presented in FIG. 12 is a variant on the dissipative component 7 mounted on element 1. The continuous or discontinuous structure 50, constituted of an isotropic material or not, homogeneous, aggregatory or composite, is rigidly attached by its base 50a to element 1 subjected to vibrations. Because of its material and geometric properties, the component 50 is given a judicious stiffness to flexion and shearing to deflect, or amplify the vibratory energies of the radiating structure. Its upper end 50b is in itself flexible enough to deform like a membrane. These deformations are a resultant of the deformations of vibrating element 1, amplified by the geometry and behaviour of component 50.

The external skin 50b is linked to a stress plate 27 with a dissipative component 6.

The continuous or discontinuous, thin, dense stress plate 27 has high membrane strength and low stiffness in flexion, contrary to the upper skin 50b.

These differences in modes and deformation amplitude impart high levels of internal deformation to the dissipative material 6 over the whole treatment surface thereby ensuring efficient conversion of the vibratory energies.

We observe also that specific motifs for component 50, by favouring flexibility in flexion/compression combined with a rigid dense stress plate 27, constitute a "spring-mass" having the intrinsic qualities of an acoustic screen damping acoustic transmissibility.

The surface device that has just been described, as for all the surface devices presented hereafter, judiciously duplicated on the surface whose vibratory response is to be damped, is particularly well adapted to the vibro-acoustic damping of plates of large dimension, for example thin vehicle body sheet metal. To adapt this surface device to the treatment of curved or warped plates, FIG. 13 proposes a variant of the surface device 7. The lower face 50a of the structure 50, of anisotropic conformation, is cut along curved lines or curves, secant or not, 53a and 53b.

Figure 13:
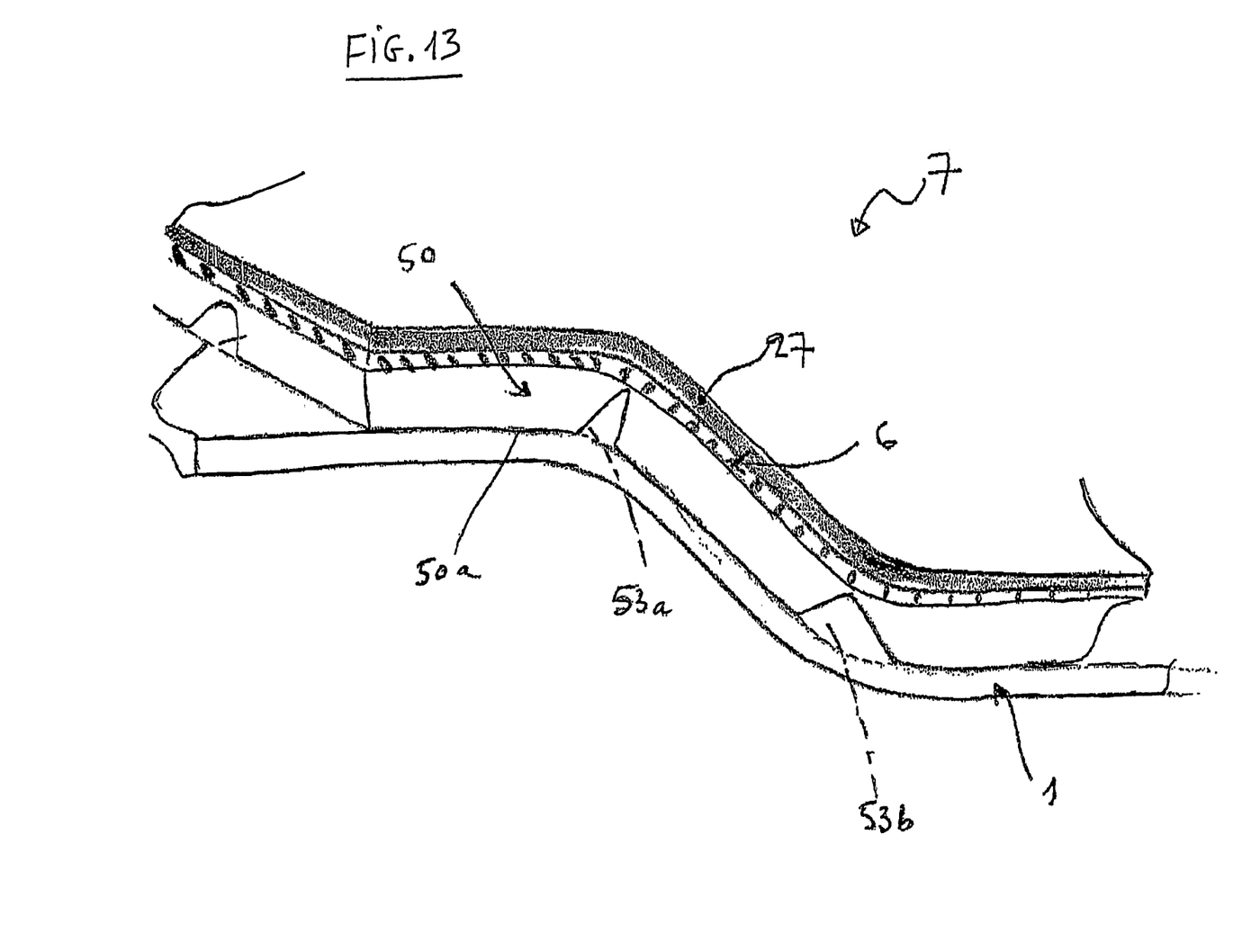

Given the low stiffness in flexion of the stress plate 27 and the dissipative material 6, the assembly 7, during its installation, is able to adapt itself to the plan or warped geometry of the vibratory structure 1. Once rigidly linked to this structure 1 using the skin 50a, the device 7 reintegrates all of the characteristics and performances of the generic concept presented in FIG. 12.

Figure 8:
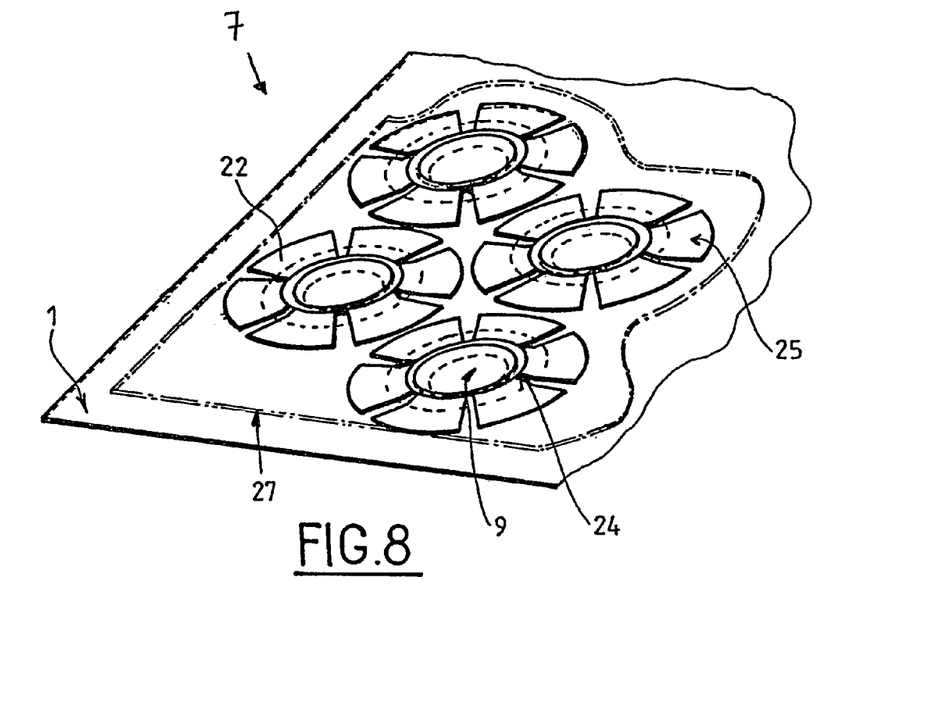
FIG. 8 shows a view of another embodiment of a multidirectional dissipative component.
Figure 9:
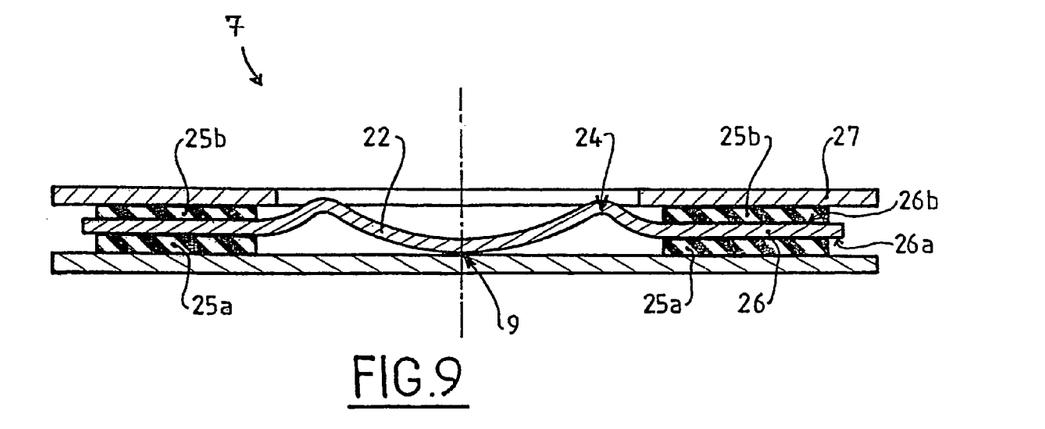

FIGS. 8 and 9 show a "daisy-shaped" surface shape 7 in which, by way of example applicable to other shapes, the dissipative material 6 described previously may be formed by viscoelastic, piezoactive, magnetostrictive or other elements having a function to convert one form of energy into another. These elements thus convert vibratory energy into heat, electric, magnetic or other energy.

In this embodiment, a dissipative component 7, shown as a section in FIG. 9, is constituted by an assembly of independent leaf springs 22, joined at their central part. This central part is linked by the rigid interface 9 to the elastic component 1, or other vibrating structure, whose vibratory response is to be damped. Each spring 22 is provided with at least one undulation 24 enabling the vibratory movements perceived at the interface 9 to be amplified in privileged directions. The lower plane surface 26a at the end of each leaf spring 22 is connected to the component 1 with a dissipative component 25a. The upper plane surface 26b at the end of each spring 22 is connected to a stress plate 27 by another dissipative component 25b. The stress plate is continuous and thus enables a multitude of "daisy" motifs to be interconnected via the dissipative component 25, as has been schematised in FIG. 8.

Thus, the conformation enables all the relative movements of the component 1 to be amplified, seen at the interfaces 9 the plane ends of the leaf springs 22 and the stress plate 27. This amplification is deflected through the dissipative material for efficient energy conversion.

Figure 10:
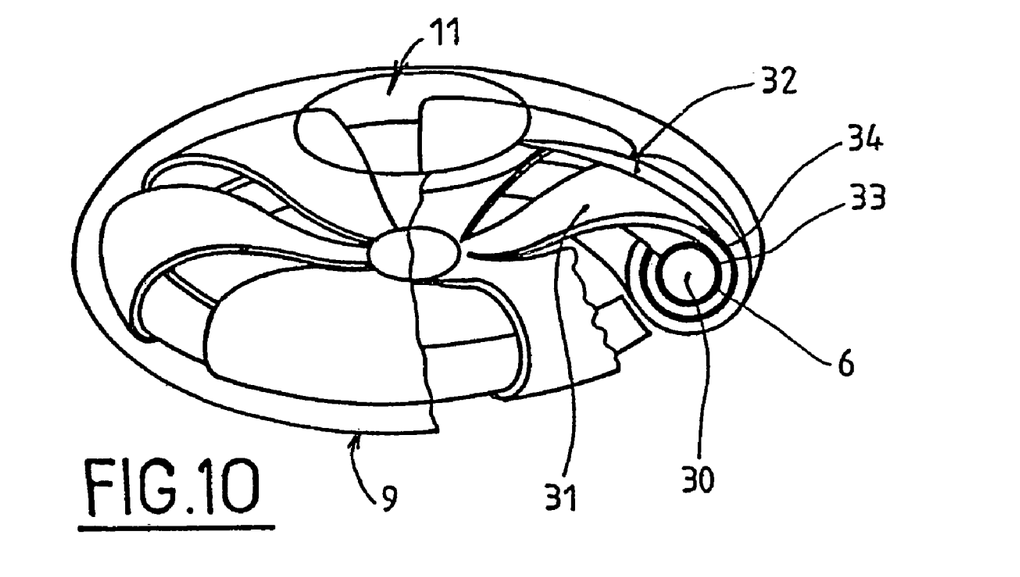
Figure 11:
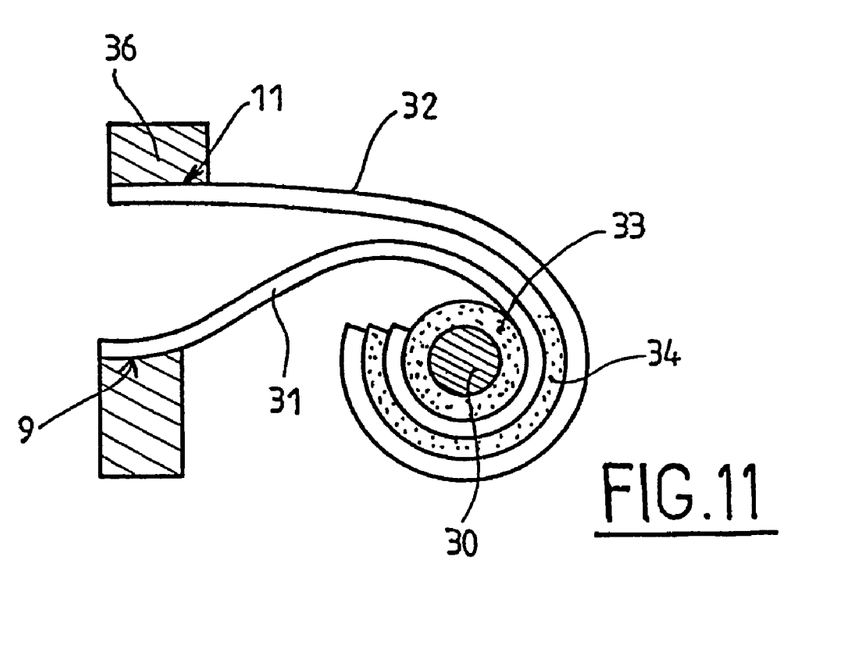

FIGS. 10 and 11 show, by judicious extension and association of the characteristics of the damping device, a variant of the filtering and damping device between an incident surface 9 and a radiating surface 11 based on the embodiment shown in FIG. 3. Each cyclically symmetrical motif is thus constituted by a judicious assembly around a ring 30 of elastic leaf springs 31 and 32. This assembly integrates a damping function with dissipative materials 33 arranged between the ring 30 and the spring 31 and dissipative materials 34 arranged between the springs 31 and 32, constituting an interface structure. In this case, each of the motifs has bases constituting its incident and radiating surfaces with respect to the surrounding motifs.

Springs 31 and 32 have an evolutive section profile converging towards central parts firmly attached to the incident and radiating surfaces, such as the surfaces 9 and 11 shown in FIG. 3. This profile may be continuous or discontinuous, axisymmetrical or dissymmetrical.

The ring 30 linking springs 31 and 32 enables them to be prestressed, because of their elastic properties, in flexion, traction or torsion, such that under the effect of the weight of the weighty element 36 inducing the radiating surface 11, the system is in a resting position in a functioning zone of low stiffness.

As a whole the geometrical characteristics and the materials constituting the springs 31 and 32 combine to intensify the non-linearity of their behaviour according to the vibratory wave. FIG. 11 shows a section in which springs 31 are wound around the ring 30 at one end and joined at the other to delimit the incident surface 9. Similarly, the inner profile of the springs 32 is predisposed to mould itself to the external profile of springs 31 when these reach their maximal deformation amplitude. Springs 32 are joined at the other end to delimit the radiating surface 11.

When a dynamic load is transmitted between the incident 8 and radiating 11 surfaces, the springs deform according to different pre-established mechanisms (flexion, buckling, torsion, traction, . . . ) depending on their initial profile and the excitation level and frequency. These different types of deformation induce a modification in the stiffness of the filtering device.

The natural frequencies of the springs are thus modified thereby enabling the filtering frequencies of the assembly to be controlled and extended.

So as to improve the non-linear dynamic behaviour of the filtering element, the inner profile of spring 32 has a potential contact surface with spring 31 by moulding itself to the form of the maximal admissible deformation of spring 31. Contact is not established when the deformation rate of spring 31 is weak. Over a certain threshold, contact is initiated over a small portion of the spring 31. The behaviour of the spring is thus slightly modified. If the dynamic load increases, the contact surface gradually increases and the dynamic behaviour of the spring 31 is strongly disturbed leading to a significant impact on the increase in stiffness.

As a whole the deformations of springs 31 and 32 generate relative rotations around the ring 30. The deformation energies are thus deflected and amplified in this zone. The presence of damping materials between the interfaces of elements 30, 31 and 31, 32 ensures the function of converting the energies of vibratory and/or acoustic origin into another form of energy, enabling damping to be integrated into the structure onto which the device has been mounted.

This particular embodiment may be used to damp vibrations from rotating machines or any other vibrating structure. Springs 31 may be connected to joint means for element 3 by surface 9 and springs 32 and for element 2 by surface 11.

It goes without saying that the dimensioning computation tools and means enable the geometry of the springs and all the dissipative components described to be adapted so as to obtain optimal efficiency. The geometry of the spring is established so as to control the different filtering frequencies required. According to the deformation state of the device according to the invention (under an applied load), it is understood that a suspension configuration with given cut-off frequencies is replaced by another state in which the cut-off frequencies have been modified. When the load is increased, a property of non-linearity is sought which enables the amplitude of the motion space or displacements under strong load levels to be limited.

The invention claimed is:

1. A process to damp and filter the amplitude of mechanically-originated vibrations of a structure to be uncoupled, wherein an incident vibratory wave is filtered with damping by absorbing a filtered vibratory wave transmitted over a frequency and mechanical load amplitude that is applied to the structure; and
   a plurality of suspension assemblies are all mounted in series between two elements of the structure with a damping device mounted in parallel to each suspension assembly of said plurality of suspension assemblies.

2. The process according to claim 1, wherein the damping device comprises an internal geometry that provides a deflection, and if required, an amplification and location of the mechanically-originated vibrations to ensure damping of the vibratory response of the structure, and the series suspension comprises a rigid static support function, and a dynamic filtering function with variable characteristics based on the level of the load that is applied to the structure.

3. A device to filter and damp the vibrations between a first element subjected to an incident vibratory wave and a second element radiating a filtered vibratory wave, wherein the device comprises: a plurality of interface structures all mounted in series between the first and second elements, that transfer vibratory energy, each of the plurality of interface structures constituted by (1) at least one elastic component and (2) at least one dissipative component attached in parallel to the elastic component, to filter and dampen the incident vibratory wave over a frequency and a mechanical load amplitude that is applied to each interface structure of said plurality of interface structures.

4. The device according to claim 3, wherein the dissipative component comprises two separate rigid frames that provide deflection functions, if required, by a lever arm effect,
   wherein amplification of the vibratory energies generated by the at least one elastic component towards a dissipative material is damped by the dissipative component.

5. The device according to claim 3, wherein the dissipative component comprises:
   a linear profile and an assembly of rigid aligned frames,
   wherein the rigid aligned frames are attached to the at least one elastic component, or to any other vibrating structure, and are independent of one another such that the relative movements of each rigid aligned frame, corresponding to an amplification by lever arm effect of the vibratory response of the elastic component, is transmitted by the end of the rigid aligned frame to a dissipative material onto which a stress plate is mounted to transfer the vibratory energy to the assembly of rigid aligned frames.

6. The device according to claim 3, wherein the dissipative component comprises:
   an element attached to the dissipative component, or to any other vibrating structure, such that the vibratory waves that are deflected, located and amplified by an internal structure of the device are transmitted, by an upper face of the element to a dissipative material that is stressed on an upper face of the dissipative material by a plate that transfers vibratory energies towards an assembly of rigid frames via the dissipative material.

7. The device according to claim 3, wherein the dissipative component is rotational and comprises an assembly of rigid frames, spaced cyclically around a central part, attached at one end to the elastic component, or to any other vibratory structure, and unattached at the another end so that the relative movements of the assembly of rigid frames are transmitted to dissipative materials, and attached at the other end to a stress plate that, through the dissipative materials, retains the assembly of rigid frames.

8. The device according to claim 3, wherein the elastic component comprises an assembly of two rotational sub-assemblies that are elastic leaf springs, and at least one end of the elastic component has an evolutive contact surface, wherein the assembly of two rotational sub-assemblies has a zone in which the at least one dissipative component is inserted.

9. The device; according to claim 8, wherein the elastic leaf springs have a potentially non-linear stiffness conferred by an evolutive geometric profile of the elastic leaf springs to ensure a gradual contact of a first leaf spring with a matching profile of a second leaf spring, to provide the evolution of the filtering frequency and a controlled relative motion space of the leaf springs according to a dynamic load that is applied.

10. The device according to claim 3, wherein the interface structure is rotational and comprises a first elastic leaf spring rigidly connected to the second element and a second elastic leaf spring rigidly connected to the first element, the leaf springs being connected together at their free ends and wound around a ring, using layers of dissipative materials, and coming into direct contact according to a dynamic load that is applied to provide a non-linear filtering and damping function.

11. The device according to claim 10, wherein the first and second elastic leaf springs have a potentially non-linear stiffness to provide, depending on the dynamic load that is applied, the evolution of the frequency and a controlled relative motion space of the first and second elements.

12. The device according to claim 3, wherein the dissipative material converts vibratory energy into heat energy by friction between materials or with viscoelastic materials, electrical energy with piezoelectric materials, magnetic energy with magnetostrictive materials, or another form of energy.

13. A filtering and damping device according to claim 3, wherein the elastic component has at least two dimensions and is formed by assemblies of beams, straight or curved bars, solid volumes, plane plates or more complex shapes, and elastic properties of the elastic component stem from elastic materials that are metallic, homogenous, isotropic or anisotropic.

14. The device according to claim 6, wherein the element comprising the dissipative component of surface profile, integrates the properties of thermal and acoustic insulation comprising cellular foam, or cork-based composites, enabling the dissipative component to preserve damping efficiency over a wide temperature range and to possess, in addition, the intrinsic performances of an acoustic screen and thermal insulator.

15. The process according to claim 1, wherein the damping device is of the parallel type and has an internal geometry able to provide a deflection, and if required, an amplification and location of the vibrations to ensure damping of the vibratory response of the structure, and wherein the series suspension concurrently has a rigid static support function, and a dynamic filtering function with variable characteristics based on the level of the load that is applied to the structure.

16. The device according to claim 5, wherein the elastic component has at least two dimensions and is formed by assemblies comprising beams, straight or curved bars, solid volumes, plane plates or more complex shapes, and
the elastic component has elastic properties that stem from elastic materials that are metallic, homogeneous, isotropic or anisotropic.

17. The device according to claim 7, wherein the elastic component has at least two dimensions and may be formed by assemblies comprising beams, straight or curved bars, solid volumes, plane plates or more complex shapes, and
wherein the elastic component has properties that stem from elastic materials that are metallic, homogeneous, isotropic or anisotropic.

18. The device according to claim 9, wherein the elastic component has at least two dimensions and may be formed by assemblies comprising beams, straight or curved bars, solid volumes, plane plates or more complex shapes, and
wherein the elastic component has properties that stem from elastic materials that are metallic, homogeneous, isotropic or anisotropic.

19. The device according to claim 11, wherein the elastic component has at least two dimensions and may be formed by assemblies comprising beams, straight or curved bars, solid volumes, plane plates or more complex shapes, and
wherein the elastic component has elastic properties that stem from elastic materials that are metallic, homogeneous, isotropic or anisotropic.

* * * * *